US006889847B1

(12) United States Patent
Gunnarsson

(10) Patent No.: US 6,889,847 B1
(45) Date of Patent: May 10, 2005

(54) FEEDING ARRANGEMENT FOR INDIVIDUAL FEEDING OF TIMBER PIECES

(75) Inventor: Cenneth Gunnarsson, Vislanda (SE)

(73) Assignee: C. Gunnarssons Verkstads AB (SE)

( * ) Notice: Subject to any disclaimer, the term of this patent is extended or adjusted under 35 U.S.C. 154(b) by 0 days.

(21) Appl. No.: 10/070,988

(22) PCT Filed: Sep. 11, 2000

(86) PCT No.: PCT/SE00/01751

§ 371 (c)(1),
(2), (4) Date: Mar. 14, 2002

(87) PCT Pub. No.: WO01/19538

PCT Pub. Date: Mar. 22, 2001

(30) Foreign Application Priority Data

Sep. 15, 1999 (SE) .............................................. 9903274

(51) Int. Cl.[7] ............................. B07C 5/14; B65G 37/00
(52) U.S. Cl. ....................................... 209/517; 198/607
(58) Field of Search ............................ 198/408, 457.03, 198/607; 209/517, 518

(56) References Cited

U.S. PATENT DOCUMENTS

| 275,960 | A | * | 4/1883 | Thomas ....................... 198/601 |
| 1,011,047 | A | * | 12/1911 | Gardner ....................... 198/360 |
| 1,807,312 | A | * | 5/1931 | Henley, Jr. .................... 99/387 |
| 2,233,850 | A | * | 3/1941 | Rapley ......................... 198/408 |
| 2,902,150 | A | | 9/1959 | Rambo |
| 3,254,764 | A | * | 6/1966 | Boyle .......................... 209/521 |
| 3,782,540 | A | | 1/1974 | Mosley |
| 4,192,639 | A | * | 3/1980 | Jones, Jr. ..................... 425/372 |
| 4,281,764 | A | * | 8/1981 | Fowler, Jr. ................... 209/557 |
| 4,358,009 | A | | 11/1982 | Rysti |
| 4,394,899 | A | * | 7/1983 | Fluck .......................... 198/408 |
| 4,669,600 | A | * | 6/1987 | Fluck .......................... 198/408 |

FOREIGN PATENT DOCUMENTS

WO        WO 01/21331        3/2001

* cited by examiner

*Primary Examiner*—Donald P. Walsh
*Assistant Examiner*—Joseph C Rodriguez
(74) *Attorney, Agent, or Firm*—Smith, Gambrell & Russell LLP

(57) ABSTRACT

A feeder arrangement for the individual feeding of timber pieces (10) to a downwardly moving conveyor (2) includes an incoming conveyor (7) and projecting carriers (23) on the downwardly moving conveyor (2). The incoming conveyor (7) is disposed for the feeding of timber pieces (10). The carriers (23) incline obliquely downwards and outwards from the downwardly moving conveyor (2). A curved guide space (21) is disposed to overlap, with a lower end portion, an upper portion of the downwardly moving conveyor (2). The angle of curvature of the guide space (21) is so great that the upper side of a timber piece (10) which comes to guide space (21) will be turned to face downwards when the timber piece (10) rests on a carrier (23). The incoming conveyor (7) has an end portion which is turned to face towards the guide space (21) and which is approximately horizontal.

21 Claims, 2 Drawing Sheets

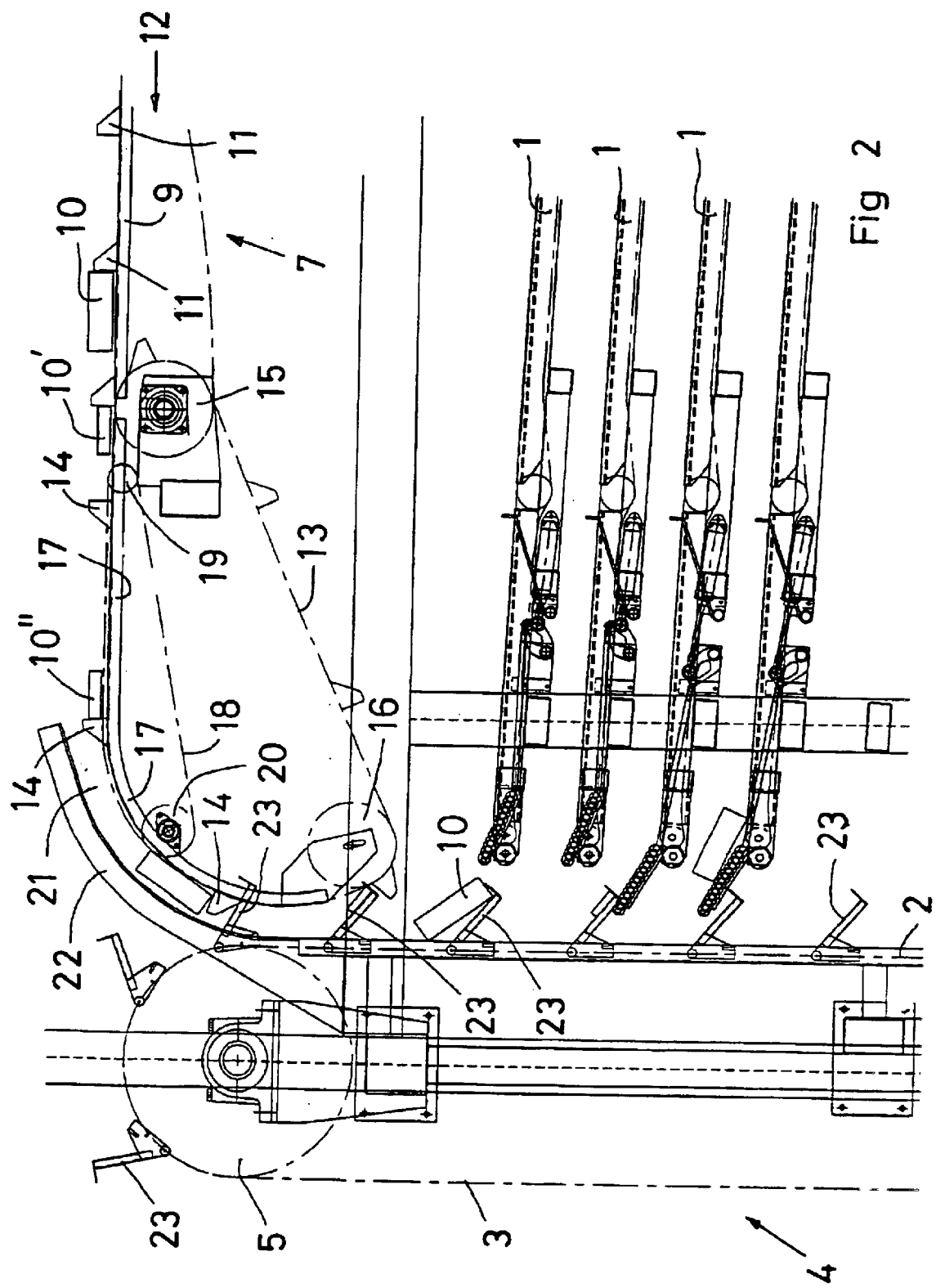

FEEDING ARRANGEMENT FOR INDIVIDUAL FEEDING OF TIMBER PIECES

TECHNICAL FIELD

Figure 1:
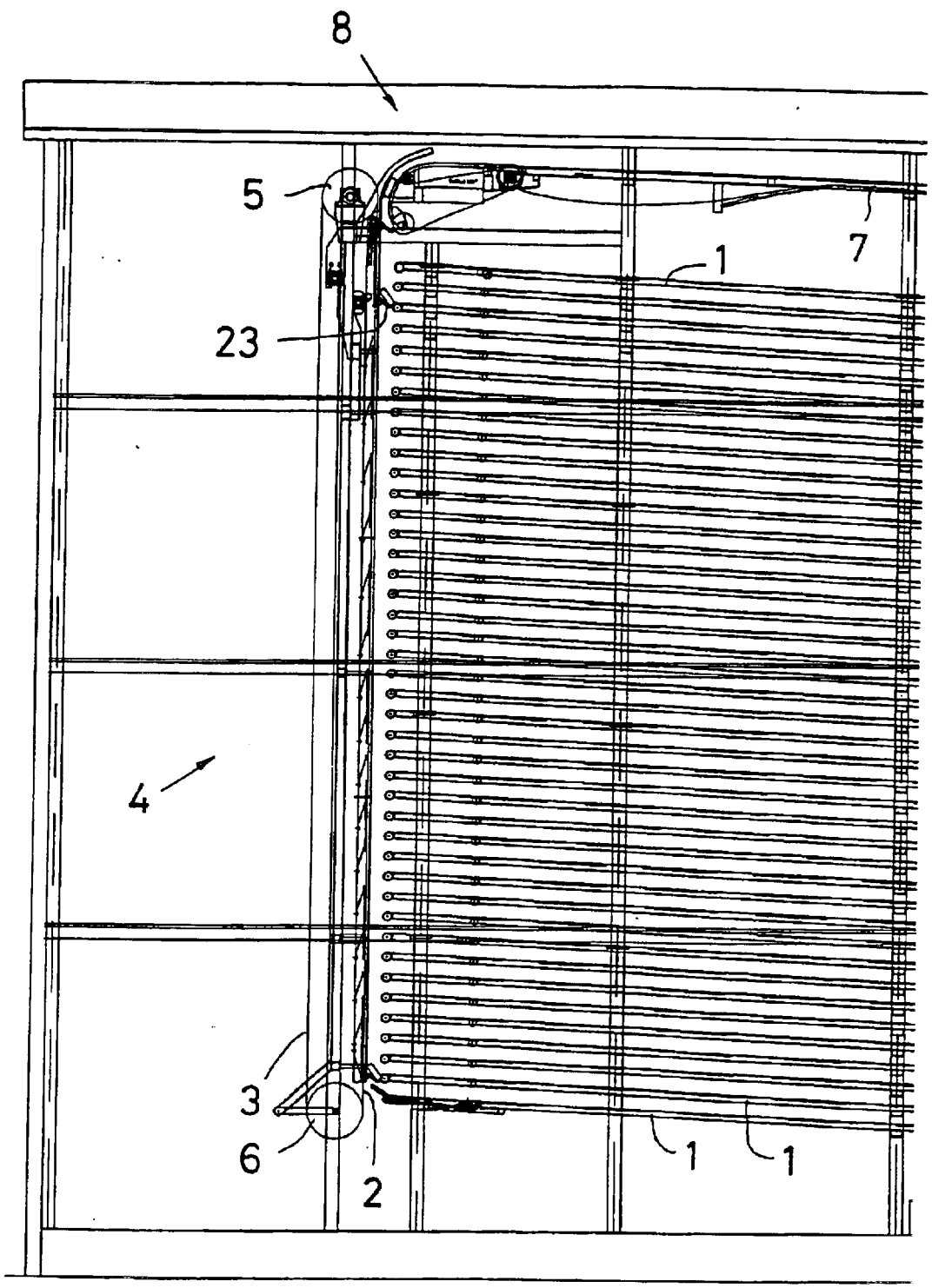

The present invention relates to a feeding arrangement for the individual feeding of timber pieces to a downwardly moving conveyor, and comprising an incoming conveyor for the supply of timber pieces and projecting carriers on the downwardly moving conveyor.

BACKGROUND ART

The present invention is intended to be applied in a plant for the sorting of individual timber pieces of different dimensions and/or qualities into a number of sorting compartments superposed over one another.

In prior art plants of the above-mentioned type, the individual sorting compartments are represented by approximately horizontal conveyors of a considerable length, of the order of magnitude of 50–100 m or possibly more. These conveyors are superposed over one another with a spacing of approximately 30–40 cm. The number of sorting compartments in the vertical direction may be large, often as many as 30–50 in number.

A downwardly moving conveyor runs along the infeed ends of the sorting compartments and conveys the individual timber pieces up to a given, predetermined sorting compartment where the timber piece is discharged by means of a transfer device and is fed into the selected sorting compartment.

Prior art plants have suffered from excessively low capacity, since the transfer of the individual timber pieces from the downwardly moving conveyor to each respective sorting compartment takes excessively long time.

In order to attempt to increase the capacity of the plant, the time available for infeed of each individual timber piece into a specific sorting compartment has been increased. This has been realised by means of an increase of the linear transport length for each timber piece on the downwardly moving conveyor from the uppermost sorting compartment to the lowermost. In order to achieve this, the downwardly moving conveyor has been placed at an inclination in that the individual sorting compartments do not begin in a vertical plane, but in a plane which inclines to the vertical. This has been achieved in that an upper sorting compartment extends out beyond a subjacent sorting compartment. The downwardly moving conveyor follows the infeed ends of the sorting compartments and displays considerable inclination in relation to a vertical plane.

The downwardly moving conveyor has a number of chains on which the timber pieces lie flat with the longitudinal direction of the timber pieces approximately at right angles to the direction of movement of the chains. This implies that the timber pieces incline in the same manner as the chains, for which reason the front edges of the timber pieces, seen in the direction of movement, are constantly located on a lower level than their rear edges. This inclination of the timber pieces is highly advantageous, or even necessary, when the timber pieces are to be transferred from the downwardly moving conveyor to each respective sorting compartment.

For feeding the individual timber pieces to the downwardly moving, inclining conveyor, use has been made of a conveyor which moves approximately horizontally and in the same direction as the downwardly moving conveyor. The transfer between these two conveyors was put into effect in a quite simple manner.

The above-described arrangement with sorting compartments, where an upper sorting compartment extends with an end portion out beyond the end of a subjacent sorting compartment implies that the length of the lowermost and shortest sorting compartment is determined by the requirements on the capacity of the plant and that, as a result, all superjacent sorting compartments will, in principle, be unnecessarily long and costly and in which the uppermost sorting compartments will be far too long.

As an attempt to obviate the need for these excessively long sorting compartments, the objective is to place the infeed ends of the sorting compartments and the downwardly moving conveyor in mutually parallel vertical planes. This requires that the downwardly moving conveyor be provided with projecting carriers which each are to carry a single timber piece. The previously known technique of feeding the downwardly moving conveyor cannot be employed in such a configuration.

Problem Structure

The present invention has for its object to design the feeding arrangement intimated by way of introduction such that it can, with high capacity, feed a substantially vertical downwardly moving conveyor with projecting carriers, at the same time as the timber pieces carried by the carriers can be given an orientation which is favourable when the timber pieces are subsequently transferred to each respective sorting compartment. In particular, the present invention has for its object to design the arrangement according to the present invention such that it affords an extremely high work rate and a high level of operational reliability.

Solution

The objects forming the basis of the present invention will be attained if the carriers incline obliquely downwards in a direction out from the downwardly moving conveyor, that a curved guide space defined by guide rails is disposed to overlap an upper region of the downwardly moving conveyor with a lower end portion, and that the angle of curvature of the guide space is so great that the upper side of a timber piece coming to the guide space will be turned downwards when the timber piece rests on a carrier.

BRIEF DESCRIPTION OF THE ACCOMPANYING DRAWINGS

The present invention will now be described in greater detail hereinbelow, with particular reference to the accompanying Drawings. In the accompanying Drawings:

FIG. 1 is a vertical side elevation of the infeed ends of an arrangement with mutually superposed sorting compartments, where the feeder arrangement according to the present invention is located over the uppermost sorting compartment; and FIG. 2 is a vertical side elevation of the arrangement according to the present invention in connection with the infeed ends of the uppermost sorting compartments.

DESCRIPTION OF PREFERRED EMBODIMENT

FIG. 1 shows a vertical side elevation of one end of a plant for sorting timber, so that the timber, after sorting, will be arranged according to timber dimensions and quality. The plant is based on a bearing structure of steel beams and, in the illustrated embodiment, has a height of approximately 20 m. The plant includes a number of sorting compartments, one for each timber dimension and quality, or possibly one for each range of dimensions or qualities. The sorting compartments are arranged superposed over one another, with a spacing in the vertical direction of 30–40 cm. Each sorting compartment includes a number of conveyors disposed at the same height and parallel with each other and carrying the timber pieces which lie only in one layer on each sorting compartment and which have their longitudinal direction horizontal and at right angles to the longitudinal directions of the conveyors and the sorting compartments, i.e. at right angles to the plane of the Drawing in FIG. 1.

In FIG. 1, reference numeral 1 relates to the above-mentioned sorting compartments, while reference numeral 2 relates to a downwardly moving part in a vertically running conveyor, while reference numeral 3 relates to an upwardly moving part in the above-mentioned conveyor. In its entirety, the conveyor, which may suitably be substantially vertical, carries reference numeral 4 and runs over an upper bending roller 5 and a lower bending roller 6.

The vertical conveyor carries the timber pieces from above and downwards for infeed of them into a specific sorting compartment 1. For feeding the timber pieces to the vertical conveyor, the plant displays an incoming conveyor 7 which is substantially horizontal, and which carries the timber pieces horizontally, with the longitudinal direction at right angles to the direction of movement of the conveyor 7 and hence at right angles to the plane of the paper in FIG. 1.

For transferring the timber pieces carried on the incoming conveyor 7, the arrangement according to the present invention has a feeder device carrying the generic reference numeral 8.

FIG. 2 shows, on a larger scale, the feeder device 8 together with an upper region of the vertical conveyor 4 and the four uppermost sorting compartments 1.

The incoming conveyor 7 has at least one end portion which is turned to face the feeder device 8 and which is substantially horizontal. The incoming conveyor 7 includes carrier rails 9 on which the timber pieces 10 slide. Further, the incoming it conveyor 7 includes drive chains, belts or the like which are provided with carriers 11 which shunt the individual timber pieces 10 ahead of them. The incoming conveyor 7 feeds the timber pieces 10 in a direction to the left in the Drawing, in accordance with the arrow 12.

In the region between the discharge end of the incoming conveyor 7 and the upper end of the vertical conveyor 4, there is disposed a synchronisation conveyor 13 with arrest members 14 which prevent individual timber pieces from moving to the left and downwards at a speed which is greater than the speed of the synchronisation conveyor 13. The synchronisation conveyor runs synchronously with the vertical conveyor 4 in the sense that an arrest member 14 must always coincide in terms of movement with a carrier 23 on the vertical conveyor 4 (as will be described in greater detail below). It is clearly apparent from the Figure how the timber pieces 10 abuts against the arrest members 14 with their front edges seen in the direction of movement. It will further be apparent that an upper region of the downwardly moving part 2 in the vertical conveyor 4 overlaps with a lower portion of the synchronisation conveyor 13, and it is in this region that the movements of the arrest members 14 and the carriers 23 are to coincide.

The path of the synchronisation conveyor 13 is determined by the two bending rollers 15 and 16, as well as by a guide rail 17 which has a straight and approximately horizontal portion facing towards the incoming conveyor 7 and an arched downward portion which is directed towards the vertical conveyor 4 and which overlaps partly with it.

The arched portion is approximately in the form of an arc and of an extent in the circumferential direction of approximately 90° or slightly more.

For transferring the individual timber pieces 10 from those positions they assume when they depart from the incoming conveyor 7 to those positions they assume with their front edges abutting against the arrest members 14 on the synchronisation conveyor 13, the arrangement according to the present invention includes a drive means with a circulating belt 18, a chain or the like. The belt 18 runs over the two bending rollers 19 and 20 and is located with its upper part slightly above the upper surface of the guide rail 17 so that the timber pieces, by friction co-operation with the belt 18, are advanced by it. The belt 18 runs with greater linear speed than that which applies to the synchronisation conveyor 13 so that the timber piece 10' along the horizontal section of the guide rail 17 is accelerated to a position which corresponds to the timber piece 10" where it subsequently follows the arrest member 14 at that speed which is defined by the synchronisation conveyor.

On the outside of the guide rail 17, there is a guide space 21 through which the timber pieces pass. The guide space 21 is defined outwardly and upwardly by an outer guide rail 22 which, at least to a part of its (approximately one quarter of a turn) length, runs approximately parallel with the curved section of the inner guide rail 17. It will be clearly apparent from the Figure how the individual carriers 23 disposed on the vertical conveyor 4 extend straight through the guide space 21.

The outer guide rail 22 has a lower end portion which may be seen as an upward extension of the vertical conveyor 4.

As was mentioned above, the inner guide rail 17 is of an extent which preferably somewhat exceeds 90°. This implies that if the upper, straight section of the guide rail 17 is horizontal, its lower end (the discharge end) will diverge somewhat away from the vertical conveyor 4 in a downward direction. Between the lower end region of the inner guide rail 17 and the vertical conveyor 4, the guide space 21 will, as a result, have a downwardly cuneiformly flaring section which is downwardly defined by a carrier 23 passing therethrough. It is in this region that the deposition of a timber piece from an arrest member 14 to a carrier 23 is completed.

It will further be apparent from the Figure that the carriers 23 incline obliquely downwards in a direction out from the downwardly moving part 2 in the vertical conveyor 4. Hereby, the carriers 23 will approximately form tangents to the bending curve of the guide space 21 when the carrier departs from the guide space. The curvature of the guide space 21 is so great that the upper side of a timber piece which is fed to the guide rail 17 will be turned to face downwards when the same timber piece rests on a carrier 23.

It was mentioned above that the synchronisation conveyor 13 in a sense ran synchronously with the vertical conveyor 4. However, the synchronisation conveyor 13 moves at greater linear speed than the carriers 23. Further, the distances between adjacent arrest members 14 is greater than between adjacent carriers 23. The synchronisation resides in the fact that a timber piece whose position in the guide space 21 is defined by an arrest member 14 is to come into contact with a carrier 23 located in the guide space, at the same position in the guide space, namely approximately where the width of the guide space begins to increase in a downward direction. Further, the arrest member 14 should have wholly passed the carrier 23 so that the timber piece rests entirely on the carrier when this departs from the guide space and the arrest member 14 begins to be angled away at the bending roller 16.

What is claimed is:

1. A feeding arrangement for individual feeding of timber to a downwardly moving conveyor, comprising:
an incoming conveyor for the supply of timber pieces and projecting carriers on the downwardly moving conveyor,
wherein the carriers incline obliquely downwards in a direction out from the downwardly moving conveyor when in a position to receive and carry individual timber pieces; that a curved guide space defined by guide rails is disposed to overlap an upper region of the downwardly moving conveyor with a lower end portion; and that the angle of curvature of the guide space is so great that the upper side of a timber piece coming to the guide space will be turned downwards when the timber piece rests on a carrier.

2. The feeder arrangement as claimed in claim 1, wherein the incoming conveyor has an end portion facing towards the guide space which is approximately horizontal; and that, the guide space has an angle of curvature downwards which is approximately 90° or greater.

3. A feeding arrangement for individual feeding of timber to a downwardly moving conveyor, comprising:
an incoming conveyor for the supply of timber pieces and projecting carriers on the downwardly moving conveyor,
wherein the carriers incline obliquely downwards in a direction out from the downwardly moving conveyor, that a curved guide space defined by guide rails is disposed to overlap an upper region of the downwardly moving conveyor with a lower end portion; and that the angle of curvature of the guide space is so great that the upper side of a timber piece coming to the guide space will be turned downwards when the timber piece rests on a carrier,
wherein a synchronisation conveyor which extends from the discharge end of the incoming conveyor and through the guide space, said synchronisation conveyor having arrest members against which rest the front edges of the timber pieces in the direction of movement.

4. The feeder arrangement as claimed in claim 3, wherein drive means is disposed along at least a part of the path of the synchronisation conveyor, said drive means being operative to act on the timber pieces at a speed which is greater than the speed of the synchronisation conveyor.

5. The feeder arrangement as claimed in claim 4, wherein the carriers have a longitudinal direction which approximately forms a tangent with the curving path of the guide space when the carrier departs from the guide space.

6. The feeder arrangement as claimed in claim 4, wherein said drive means includes a circulating belt on which rest the timber pieces.

7. The feeder arrangement as claimed in claim 3, wherein the carriers have a longitudinal direction which approximately forms a tangent with the curving path of the guide space when the carrier departs from the guide space.

8. The arrangement according to claim 7, wherein one inner and one outer guide rail are provided along a downwardly curved portion of the synchronisation conveyor, said guide rails defining therebetween a guide space into which the arrest means extend.

9. A feeding arrangement for individual feeding of timber to a downwardly moving conveyor, comprising:
an incoming conveyor for the supply of timber pieces and projecting carriers on the downwardly moving conveyor,
wherein the carriers incline obliquely downwards in a direction out from the downwardly moving conveyor; that a curved guide space defined by guide rails is disposed to overlap an upper region of the downwardly moving conveyor with a lower end portion, and that the angle of curvature of the guide space is so great that the upper side of a timber piece coming to the guide space will be turned downwards when the timber piece rests on a carrier,
wherein the carriers have a longitudinal direction which approximately forms a tangent with the curving path of the guide space when the carrier departs from the guide space.

10. The feeder arrangement as claimed in claim 9, further comprising a drive means that includes a circulating belt on which rest the timber pieces.

11. A feeding arrangement for individual feeding of timber to a downwardly moving conveyor, comprising:
an incoming conveyor for the supply of timber pieces and projecting carriers on the downwardly moving conveyor,
wherein the carriers incline obliquely downwards in a direction out from the downwardly moving conveyor; that a curved guide space defined by guide rails is disposed to overlap an upper region of the downwardly moving conveyor with a lower end portion; and that the angle of curvature of the guide space is so great that the upper side of a timber piece coming to the guide space will be turned downwards when the timber piece rests on a carrier,
wherein the incoming conveyor has an end portion facing towards the guide space which is approximately horizontal, and that, the guide space has an angle of curvature downwards which is approximately 90° or greater,
wherein a synchronisation conveyor which extends from the discharge end of the incoming conveyor and through the guide space, said synchronisation conveyor having arrest members against which rest the front edges of the timber pieces in the direction of movement.

12. A feeding arrangement for the feeding of individual timber pieces onto a downwardly moving conveyor, comprising:
an incoming conveyor for the supply of timber pieces;
carriers on the downwardly moving conveyor, said carriers incline obliquely downwards in a direction out from the downwardly moving conveyor;
guide rails defining therebetweeen a downwardly curved guide space, said guide rails being stationary and located to overlap, with lower portions thereof, an upper part of the downwardly moving conveyor, and an angle of curvature of said guide space being so great that an upper side of a timber piece entering the guide space is facing downwardly when that timber piece has reached and is resting on a carrier.

13. The feeder arrangement as claimed in claim 12, wherein the incoming conveyor has an end portion facing towards the guide space which is approximately horizontal; and that, the guide space has an angle of curvature downwards which is approximately 90° or greater.

14. The feeder arrangement as claimed in claim 12, further comprising a synchronisation conveyor which extends from the discharge end of the incoming conveyor and through the guide space, said synchronisation conveyor having arrest members against which rest the front edges of the timber pieces in the direction of movement.

15. The feeder arrangement as claimed in claim 14, wherein drive means is disposed along at least a part of the path of the synchronisation conveyor, said drive means being operative to act on the timber pieces at a speed which is greater than the speed of the synchronisation conveyor.

16. The feeder arrangement as claimed in claim 12, wherein the carriers have a longitudinal direction which approximately forms a tangent with the curving path of the guide space when the carrier departs from the guide space.

17. The feeder arrangement as claimed in claim 15, wherein said drive means includes a circulating belt on which rest the timber pieces.

18. A feeding arrangement for feeding of individual timber pieces onto a downwardly moving conveyor, comprising:

an incoming conveyor for the supply of timber pieces;

carriers on the downwardly moving conveyor, said carriers incline obliquely downwards in a direction out from the downwardly moving conveyor;

an inner and one outer curved guide rail defining therebetween a downwardly curved guide space, said inner guide rail having an angle of curvature exceeding 90° whereby said guide space diverges in a downward direction at a lower end portion thereof, said carriers of the downwardly moving conveyor passing through this lower end portion of the guide space to receive and carry away timber pieces passing through the guide space.

19. A feeding arrangement for feeding of timber pieces onto a downwardly moving conveyor, comprising:

an incoming conveyor for the supply of individual timber pieces;

carriers on the downwardly moving conveyor, said carriers following a substantially vertical path of travel;

drive means for receiving timber pieces from the incoming conveyor, said drive means having a linear speed of travel greater than that of the incoming conveyor;

a synchronisation conveyor having arrest means, said arrest means following a downwardly curved path of travel from the drive means to an upper end portion of the downwardly moving conveyor, said arrest means further moving in synchronism with the carriers of the downwardly moving conveyor, said arrest means also being configured for transferring timber pieces from the drive means and delivering them on to the carriers of the downwardly moving conveyor.

20. The arrangement according to claim 8, wherein the inner guide rail has an angle of curvature greater than 90°, whereby the upper side of a timber piece entering the guide space is facing downwards when that timber piece has been delivered onto a carrier of the downwardly moving conveyor.

21. A feeding arrangement for individual feeding of timber to a downwardly moving conveyor, comprising:

an incoming conveyor for the supply of timber pieces and projecting carriers on the downwardly moving conveyor, wherein the carriers incline obliquely downwards in a direction out from the downwardly moving conveyor; that a curved guide space defined by guide rails is disposed to overlap an upper region of the downwardly moving conveyor with a lower end portion; and that the angle of curvature of the guide space is so treat that the upper side of a timber piece coming to the guide space will be turned downwards when the timber piece rests on a carrier, wherein the incoming conveyor has an end portion facing towards the guide space which is approximately horizontal; and that, the guide space has an angle of curvature downwards which is approximately 90° or greater, wherein the carriers have a longitudinal direction which approximately forms a tangent with the curving path of the guide space when the carrier departs from the guide space.

* * * * *